Feb. 19, 1924.

C. STEFANI

CHANGE SPEED TRANSMISSION

Filed Oct. 18, 1922

1,484,197

INVENTOR
Carlo Stefani.
BY
R. S. Waters
ATTORNEY

Patented Feb. 19, 1924.

1,484,197

UNITED STATES PATENT OFFICE.

CARLO STEFANI, OF MILAN, ITALY.

CHANGE-SPEED TRANSMISSION.

Application filed October 18, 1922. Serial No. 595,450.

*To all whom it may concern:*

Be it known that I, CARLO STEFANI, subject of King of Italy, residing at 14 Via Tonale, Milan, Italy, have invented certain new and useful Improvements in Change-Speed Transmissions, of which the following is a specification.

This invention relates to a change speed transmission for use in the continuous transmission of rotary motion from a driving to a driven shaft.

In accordance with this invention, two conical wheels having teeth of uniform pitch throughout extending along the length of the cone and covering substantially one-half of each conical surface are arranged to mesh with an intermediate wheel; and the two conical wheels are simultaneously rotated so that the teeth of the one conical wheel move out of mesh with the intermediate wheel as the teeth of the other conical wheel move into mesh with the said intermediate wheel; and the gear ratio is varied by varying the position of the intermediate wheel relatively to the large and the small diameters of the conical wheels.

The invention is illustrated by way of example on the accompanying drawing whereon:—

Figure 1:
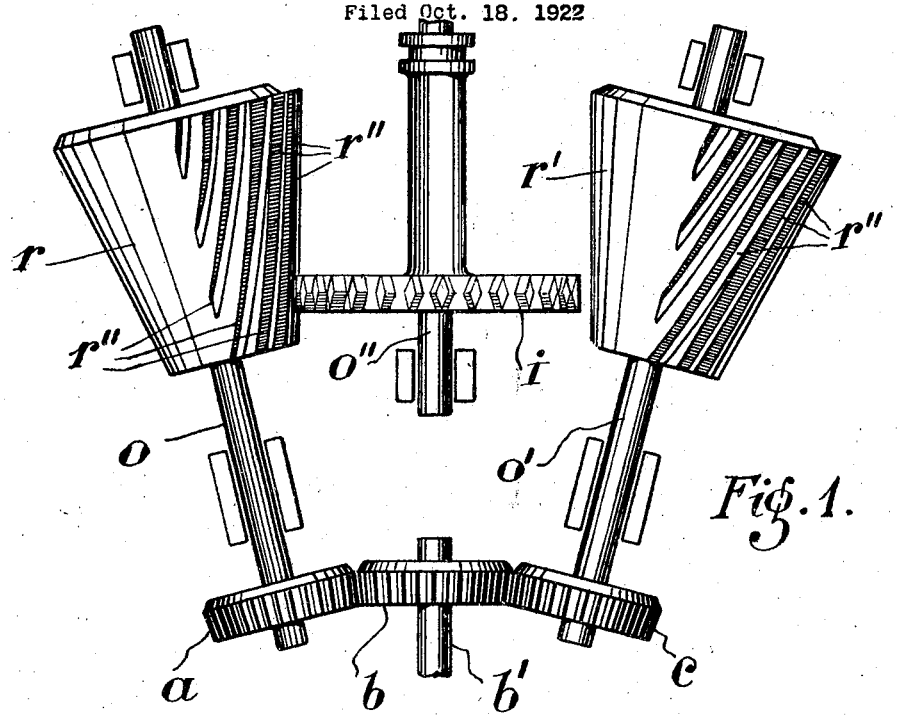
Fig. 1 is a plan view of the gear.

Referring to Fig. 1 of the drawing, two conical wheels $r$, $r'$ are secured on their shafts $o$, $o'$ so that the adjacent sides of the conical wheels are parallel to each other and are capable of meshing with an intermediate wheel $i$ secured or keyed upon a shaft $o''$: the said shafts $o$, $o'$ and $o''$ being all mounted in the same plane. Mounted on the shafts $o$, $o'$ are a pair of bevel or spur wheels $a$, $c$ respectively, and meshing with and driving the said wheels $a$, $c$ is a bevel or spur wheel $b$ mounted on the driving shaft $b'$. One-half of the circumference of each of the conical wheels is provided with teeth $r$ of uniform pitch throughout extending along the length of the cone. The intermediate wheel $i$ is arranged so as to mesh with the teeth $r$ of one or other of the conical wheels $r$, $r'$, and is preferably adapted to slide axially upon the shaft $o''$; being keyed or splined thereon so as to transmit its rotary motion to the said shaft whilst being free to move axially for the purpose of varying the gear ratio.

Figures 2, 3, 4:
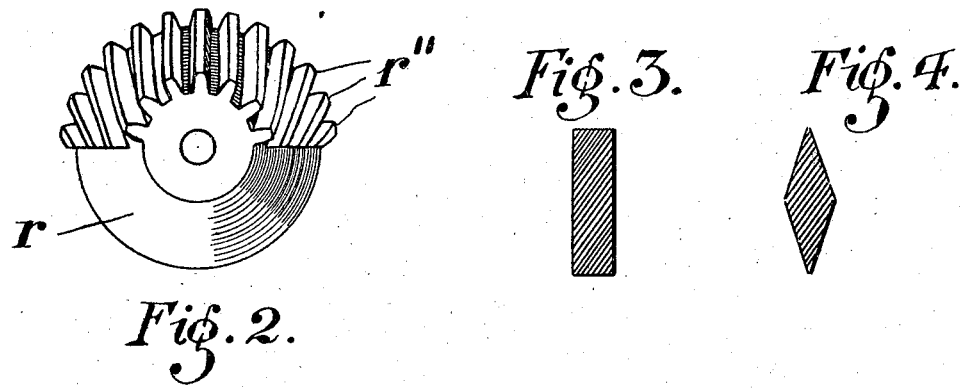
Fig. 2 is an end view of one of the conical wheels.
Fig. 3 is a cross-section of a tooth of an ordinary tooth wheel—taken on a plane tangential to the wheel and parallel to the wheel axis.
Fig. 4 is a view similar to Fig. 3, but showing a special form of tooth for the intermediate wheel.

The teeth of the intermediate wheel $i$ are of a pitch and depth to correspond to the teeth $r''$, of the conical wheels, but instead of being rectangular in cross-section as in ordinary tooth wheel construction (see Fig. 3), the teeth of the wheel $i$ are preferably of rhomboidal form in cross-section as shown at Fig. 4. This construction of tooth is designed to suit the varying inclination of the constant pitch teeth $r''$ due to the taper of the wheels $r$, $r'$.

In operation, and referring to Fig. 1, the rotation of the conical wheels $r$, $r'$ is effected through the medium of the gears $d$, $b$, $c$, from the shaft $b'$ and the motion of the conical wheel $r$ is directly transmitted to the intermediate wheel $i$ by their intermeshing teeth; and as the teeth of the wheel $r$ move out of mesh with the teeth of the wheel $i$, the teeth of the wheel $r'$ will come into operation by moving into mesh with the teeth of the intermediate wheel so that the latter is driven continuously. By sliding the intermediate wheel $i$ towards the bases of the conical wheels $r$, $r'$ the speed of the wheel $i$ is increased whilst the speed of the wheels $r$, $r'$ remains unaltered.

If so desired the drive may be from the shaft $o''$ through the gears $i$, $r$, $r'$, to the shafts $o$, $o'$ and through the gears $a$, $c$, $b$ to the shaft $b'$. Instead of shifting the wheel $i$ in an axial direction to change the gear ratio, this wheel may remain in one position whilst the conical wheels $r$, $r'$ and gears $a$, $b$, $c$ may be shifted bodily with their shafts $o$, $o'$ and shaft bearings in relation to the said wheel $i$.

What I claim is:—

1. A change speed transmission comprising two conical wheels having teeth of uniform pitch throughout extending along the length of the cone and covering substantially one half of each conical surface, an intermediate toothed wheel meshing with the toothed conical wheels, and means for rotating the two conical wheels simultaneously so that the teeth of the one move out of mesh with the intermediate wheel as the teeth of the other move into mesh with the said intermediate wheel.

2. A change speed transmission according to claim 1 in which the teeth of the intermediate wheel are shaped so that a section of a tooth taken on a plane tangential to the wheel and parallel to the wheel axis is of rhomboidal form.

3. A change speed transmission comprising two conical wheels having parallel teeth of uniform pitch throughout extending along the length of the cone and covering substantially one half of each conical surface, the adjacent sides of the cones being parallel to each other, a slidable intermediate toothed wheel in mesh with the teeth of the conical wheels, and means for rotating the two conical wheels simultaneously and in the same direction so that the teeth of one conical wheel move out of mesh with the intermediate wheel as the teeth of the other conical wheel move into mesh with the intermediate wheel.

In testimony whereof I affix my signature.

ING. STEFANI, CARLO.